ROBERT A. GREENKORN &
CARLTON R. JOHNSON INVENTORS

Nov. 15, 1966 R. A. GREENKORN ET AL 3,285,064
METHOD FOR DEFINING RESERVOIR HETEROGENEITIES
Filed Nov. 3, 1965 2 Sheets-Sheet 2

- q — PULSE RATE, BPD
- $t_L$ — TIME LAG, MIN.
- $\Delta t$ — PULSE LENGTH, MIN.
- $\Delta t_b$ — TIME BETWEEN PULSES, MIN.
- $\Delta P$ — RESPONSE AMPLITUDE, PSI

ROBERT A. GREENKORN &
CARLTON R. JOHNSON  INVENTORS

BY *Gary C. Honeycutt*

ATTORNEY 3,285,064
METHOD FOR DEFINING RESERVOIR HETEROGENEITIES
Robert A. Greenkorn, West Lafayette, Ind., and Carlton R. Johnson, Houston, Tex., assignors to Esso Production Research Company, a corporation of Delaware
Filed Nov. 3, 1965, Ser. No. 506,240
18 Claims. (Cl. 73—155)

This application is a continuation-in-part of application Serial No. 245,566 filed December 18, 1962, and now abandoned. This invention relates to the evaluation of porous subsurface reservoirs. A reservoir description technique is provided which can be completed more quickly, and which defines heterogeneities more specifically than conventional methods. In most reservoirs the method of the invention provides quantitative or semi-quantitative values for transmissibility ($kh/\mu$) and storage ($\phi ch$), where:

$k$=permeability of the reservoir to mobile reservoir fluids, md.
$h$=reservoir thickness, ft.
$\mu$=viscosity of reservoir fluids, cps.
$c$=compressibility of reservoir fluids, volume/volume/p.s.i.
$\phi$=pore volume/total rock volume In accordance with the invention, a fluid flow-rate pulse is introduced into the reservoir at a first well, and the pressure transient generated by the pulse is determined at one or more spaced locations or wells within the reservoir. For example, fluid injection into the reservoir at a first well is changed from one rate to another, and is then returned to the initial rate. The speed and amplitude of the resulting pressure transient within the reservoir caused by these changes in injection flow rate are determined by pressure measurements at one or more spaced wells. Similarly, a suitable flow-rate pulse may be introduced into the reservoir by first altering the rate of fluid production at a first well, then returning to the initial rate, and determining pressure changes as a function of time at one or more locations in the reservoir.

The magnitude and duration of the flow-rate pulse, whether injection or production, are limited within a critical range. Specifically, the pressure changes detectable at a responsive or observation well must be large enough to provide reliable data for interpretation, but not large enough to affect substantial portions of the reservoir outside the intended scope of evaluation. In essence, therefore, the method of the invention determines the fluid flow and storage character of a limited portion of the reservoir, within the vicinity of the given well pair, to the substantial exclusion of surrounding portions of the reservoir.

A knowledge of the areal and vertical distribution of fluid transmissibility and storage in a reservoir is essential to the determination of a development and production program which will result in the maximum economic recovery of reservoir fluids. The spacing of wells, the rates of production, stimulation procedures, and pressure maintenance programs, for both primary and secondary recovery are based to a large extent upon a determination or estimation of such reservoir heterogeneities.

Various techniques are currently available to the industry for testing and measuring the behavior of reservoir fluids and matrices. A principal limitation of these techniques, however, with rare exception, is that the analyses and descriptions are based upon samples and physical measurements of an extremely small fraction of the entire reservoir; namely, the fraction occupied by wellbores. Substantial variations in reservoir properties frequently occur between wells, thereby invalidating conclusions reached by the usual interpolation of data between widely scattered observation points. Accordingly, it is an object of the present invention to overcome this limitation by obtaining a more direct measure of reservoir properties between wells. It is a further object of the invention to provide a method for locating permeability barriers in a reservoir. A still further object of the invention is to provide a method for testing vertically separated producing zones to determine whether they are interconnected. The method is also useful for determining fracture orientation.

It has been known for many years that the gross properties of a reservoir can be determined by so-called "interference testing." In the interference test, constant rate production or injection is initiated at one well, and the effect of this flow is measured as pressure versus time at another well. Useful interpretation of the interference test requires that the constant rate production or injection at the input well be continued for a prolonged period of time, while the record of pressure change at one or more observation wells is continued for the same period of time. The test is complete whenever it can be determined that the record of pressure change at the observation well has assumed a truly logarithmic decline or buildup. A successful interference test not only requires a prolonged control of the input well, and a prolonged observation period, but also requires that flow rates at other wells of the reservoir be stabilized prior to the test and kept substantially quiescent for the entire duration of the test, or the changes carefully recorded and entered into the calculations—a task that makes computation highly complex and subject to error. Since there is seldom any assurance that the results of an interference test will be of sufficient value to offset the expense of running the test, it is not surprising that the industry has made very limited use of the interference test. Moreover, even assuming a fully successful interference test, the information obtained does not permit separate analysis of small regions of the reservoir, but instead inherently averages the permeability, thickness and storage character of extensive regions of the reservoir. By contrast, the method of the present invention separately evaluates the reservoir characteristics in the vicinity of each selected well pair.

The present invention is based in part upon the discovery that a pressure disturbance or pressure transient imparted to a reservoir by relatively small changes in flow rate at a first well can be reliably determined in a well spaced therefrom a distance of at least several hundred feet. Also, it has been discovered that the time required for the resulting pressure disturbance to traverse a given distance through the reservoir, in combination with the amplitude of the responsive pressure change, is a measure of both the transmissibility and the reservoir storage in the vicinity of the input and responsive wells.

The objects of the invention are best realized in general by introducing a sequence of at least three flow rate changes at the input well. For example, a useful sequence at an injection well comprises first initiating a constant rate injection flow, after a substantial shut-in time, for the purpose of at least partially stabilizing that portion of the reservoir under study. The second change of flow rate is conveniently a return to shut-in or zero flow. After a limited period of shut-in, preferably comparable to the initial period of injection flow, the well is again opened to injection flow, which may be the same flow rate as the initial pulse. Concurrently with these three changes of flow rate, a responsive pattern of pressure changes is determined at one or more observation wells. The increase in pressure at an observation well, caused by the initial injection flow, normally reaches a "peak" during the interval of shut-in between the two periods of injection flow. A subsequent pressure decline at the observation well is then interrupted by the renewed injection at the input well. A sufficient record of pressure change is completed whenever the effect of renewed injection at the input well has caused the pressure record at the observation well to again exhibit a distinct upward slope or "buildup."

An equivalent sequence of at least three flow rate changes may readily be introduced into a reservoir at a producing well. For example, a useful sequence comprises first initiating constant rate production flow, after a substantial shut-in time, for the purpose of at least partially stabilizing that portion of the reservoir in the vicinity of the well pair under study. The second change of flow rate is conveniently a return to shut-in, or zero production flow. After a limited period of shut-in, preferably comparable to the initial period of production flow, the well is again opened to production flow, which may be the same flow rate as the initial pulse. Concurrently with these three changes of flow rate, a responsive pattern of pressure changes is determined at one or more observation wells. The decrease in pressure at an observation well, caused by the initial production flow, normally reaches a minimum during the interval of shut-in between the two periods of production flow. A subsequent pressure buildup at the observation well is then interrupted by the renewed production at the input well. A sufficient record of pressure change is completed whenever the effect of renewed production at the input well has caused the pressure record at the observation well to again exhibit a distinct downward slope, indicating pressure decline.

In accordance with a still further embodiment of the invention, a single pulsing period may be given a segmented character. That is, a pulse may be introduced into the reservoir having an initial amplitude of 500 barrels per day for a duration of one hour, for example, followed immediately by a period of pulse flow having an amplitude of 200 barrels per day for a duration of one hour, followed immediately by a return to a pulse rate of 500 barrels per day for an additional two hours.

For best results, the responsive record of pressure change must be followed by means of a very sensitive pressure-measuring device, located either directly in the observation well or at the wellhead. In most reesrvoirs, the sensitivity of pressure measurement at the responsive well must be plus or minus 0.01 p.s.i. or better. The need for a reliable measurement of small pressure variations has led to the development of an extremely sensitive differential pressure-measuring system which has been disclosed and claimed in a copending application of Carlton R. Johnson and Ray Raynor, Serial No. 245,584, filed December 18, 1962, now Patent No. 3,247,712. Other pressure-measuring devices, provided they are adequately sensitive and accurate, may also be used in monitoring pressure variations at a responsive well in accordance with the present invention. The pressure measurements are made either at the wellhead or downhole. Wellhead pressure measurements are usually suitable, even at a responsive well which is not liquid-filled. Greater sensitivity may be obtained, however, by filling such wells with a liquid which is lighter than the reservoir fluids, such as propane, butane, or kerosene.

Figure 1:
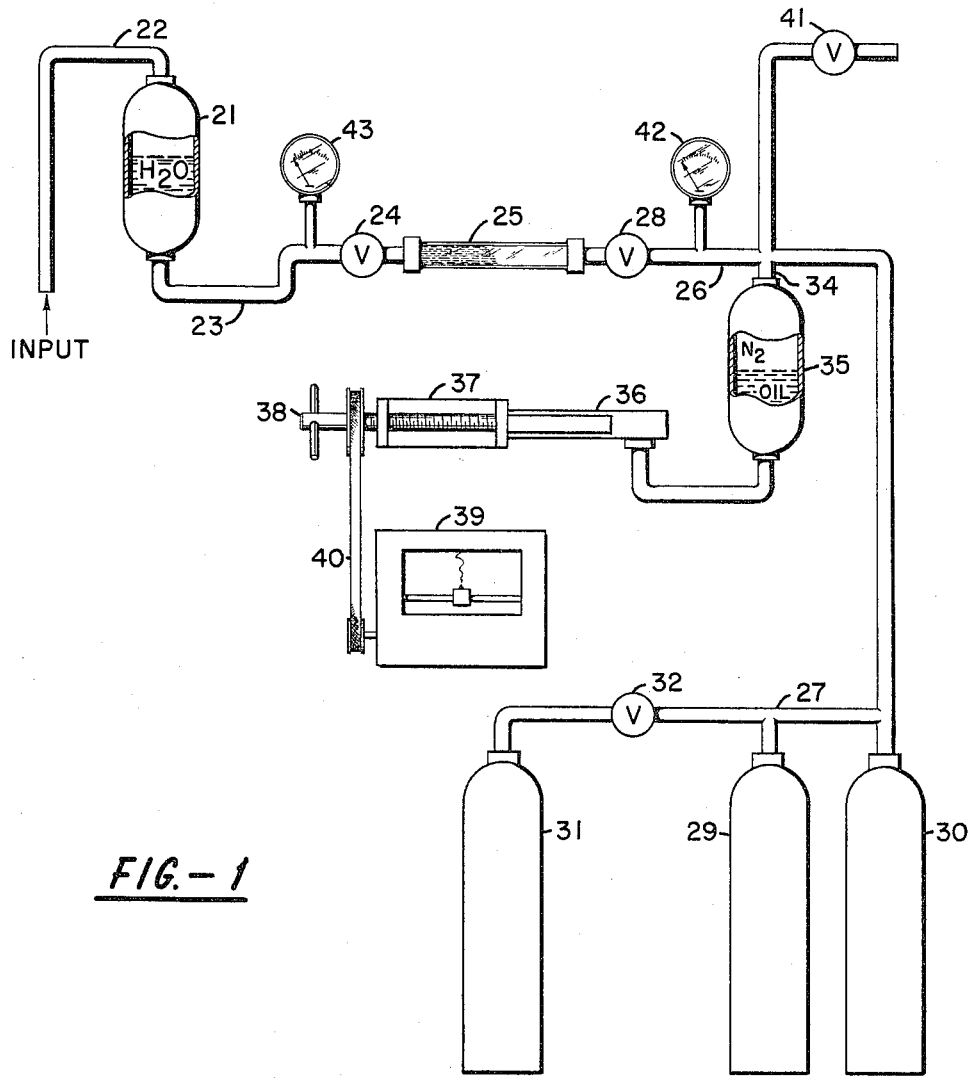
FIGURE 1 shows an apparatus for measuring pressure change, developed for use in practicing the invention.

Referring now to FIGURE 1, the apparatus is composed of surge vessel 21, the upper inlet of which is adapted for connection to the wellhead. Conduit 23 leading from the lower end of vessel 21 is connected through valve 24 to meniscus-forming tube 25. The opposite end of tube 25 is connected by lines 26 and 27 through valve 28 to reference pressure cylinders 29 and 30, and to recharge cylinder 31 through valve 32.

Branch line 34 running from conduit 26 contains surge vessel 35 and terminates with cylinder 36 of positive displacement pump 37. Pump piston 38 is a helical screw, moved into or out of cylinder 36 by rotary motion imparted thereto. Recorder 39 is connected to piston 38 by means of belt drive 40.

In operation, a responsive wellhead pressure is admitted to inlet 22 of vessel 21 which contains water or other fluid capable of forming a meniscus when admitted to tube 25. Cylinder 31 contains a reserve supply of nitrogen or other gas at a pressure substantially in excess of the input pressure, differential changes in which are to be measured. Initially, cylinders 29 and 30 contain gas at a pressure somewhat below that of the wellhead input pressure. While valve 28 is closed, valve 32 is momentarily opened to provide a reading at pressure gauge 42 which is slightly greater than the input pressure measured at gauge 43. Valves 24 and 28 are then opened, admitting the opposing pressures to tube 25. Since the reference pressure supplied from cylinders 29 and 30 is slightly greater than the input pressure measured at gauge 43, a gas-water interface will temporarily be located within line 23. By slowly bleeding excess pressure through valve 41, the water level within line 23 is readily drawn into meniscus-forming tube 25. Valve 41 is then closed when the meniscus within tube 25 is stabilized at a balance point indicated by a suitable hairline or other mark on tube 25.

After the balancing procedure, small changes in the input pressure tend to cause the meniscus to drift from the center line of tube 25. Pump 37 is controlled by rotating piston 38 to charge or discharge reference cells 29 and 30 sufficiently to compensate for the drift of the meniscus, and to hold it at the center line of tube 25. Revolutions of piston 38 are recorded by instrument 39 which plots the changes in pump displacement versus time. By measuring the volume of reference cells 29 and 30, in combination with the connecting line associated therewith, and cylinder 36, differential input pressures as recorded are easily converted to pounds per square inch, or other desired units.

Figure 2:
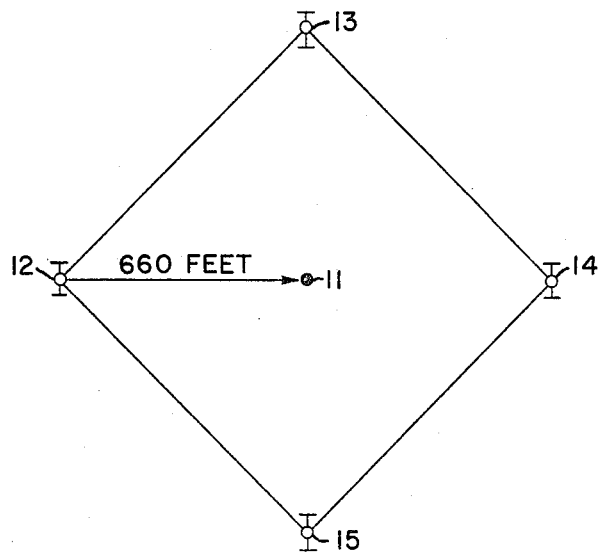
FIGURE 2 is a diagram of the well spacing in a five-spot pattern tested in accordance with the invention.

In FIGURE 2, well 11 is surrounded by wells 12 through 15. A sequence of three flow-rate changes is initiated at well 12 by injecting water or other fluid therein at a rate of about 350 bbls. per day, for example. After a suitable time, for example one hour, the well is shut in for 1.25 hours (for example), and thereafter injection is resumed. Responsive variations in pressure are measured at well 11 as a result of the injection flow-rate sequence generated at well 12. The time required for the generated pulse cycle to traverse the distance between wells, and the amplitude of the responsive pressure transient are accurately determined.

Next, an injection flow-rate sequence substantially the same as before is generated successively at each of wells 13, 14, and 15, with the corresponding measurement of time lapse and responsive amplitude being made each time at well 11. A comparison of the responsive pulse amplitudes, and of the velocities at which the pulses travel between the respective well pairs gives a direct measure of the differences in fluid transmissibility and storage between the respective well pairs. In order to obtain a complete map of relative fluid transmissibilities throughout a given field, pressure pulse tests are conducted between successive well pairs of each five-spot pattern, for example, or for any desired spacing pattern. If desired, a calibration curve may be prepared in which transmissibility values are plotted versus the time lapse of a pressure pulse in traversing the distance between wells, using a limited number of core analyses, or equivalent data, to establish a quantitative relationship.

The time interval which is permitted to elapse between the termination of a given flow-rate pulse and the initiation of the next subsequent flow-rate pulse is preferably at least as great as the time of duration of the pulse which has just been terminated. It is within the scope of the invention, however, to select a ratio, R, of the time interval between pulses, $\Delta t_b$, to pulse time, $\Delta t$, in the range of 0.1:1 up to a ratio about 20:1.

Figure 3:
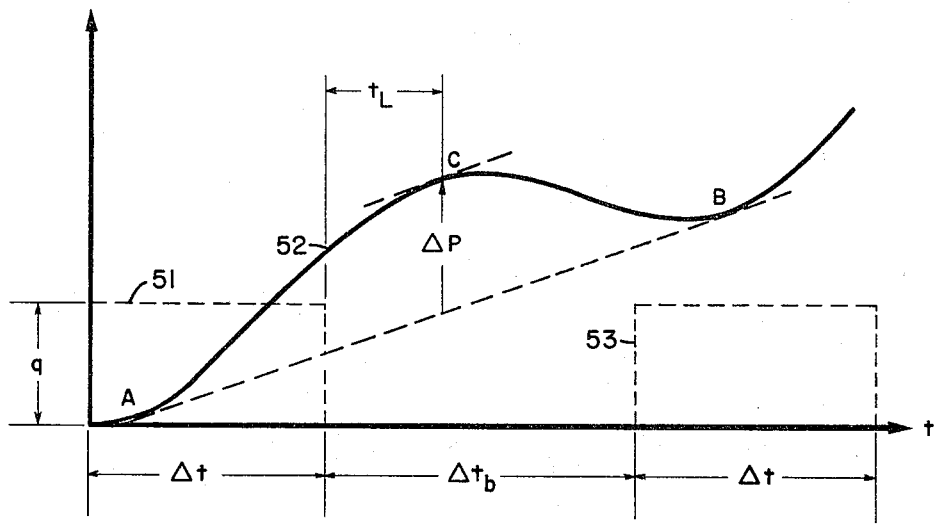
FIGURE 3 shows a record of fluid input rates at an injection well of FIGURE 2, and a record of responsive pressure change measured at the center well of FIGURE 2.

FIGURE 3 illustrates the input and responsive records obtained in testing one well pair in a well pattern such as that of FIGURE 2. A "square" flow-rate pulse 51 is generated at a first well by the injection of water at a rate of "$q$" barrels per day for a time $\Delta t$. As a result of the injected flow-rate pulse, a pressure transient is propagated through the reservoir. The resulting increase in pressure is measured in an adjacent observation well, at a distance "$r$" from the input well, and is plotted as curve 52, using the same time scale as the injected flow-rate pulse. After a certain time interval, $\Delta t_b$, while continuing the pressure measurements at the observation well, a second flow-rate pulse 53 is initiated at the input well by the injection of water at a rate of "$q$" barrels per day, as before. Continued measurement of the resulting pressure changes at the observation well reflects a decline in pressure just prior to the initiation of pulse 53. Soon after the beginning of pulse 53, pressure curve 52 again shows a pressure buildup beginning just before point "B."

It is not essential in accordance with the embodiment of FIGURE 3 to complete pulse 53; that is, a satisfactory completion does not require the recording of further pressure response data beyond the time required to clearly establish point "B" along curve 52. The time lag, $t_L$, and response amplitude, $\Delta P$, are then determined by connecting point "A" with "B," these being points at which the line AB is tangent to curve 52. The drawing of a second tangent parallel to line AB locates point "C" on curve 52. $\Delta P$ is determined as the pressure difference represented by the vertical distance between the two tangent lines.

Pulse 51 and pulse 53 are indicated to have the same amplitude and duration. A sequence of identical pulses was chosen for simplicity of analysis; however, in certain instances it is desirable to "code" the input by generating a sequence of pulses having substantially different amplitudes and durations. For example, an initial pulse having a flow-rate amplitude of 200 barrels per day and a duration of two hours may be followed after a time of three hours, for example, with a pulse having an amplitude of 100 barrels per day and a duration of only one hour. It will be apparent to those skilled in reservoir technology that the interpretation of a responsive pressure transient in the case of unequal pulses will differ somewhat from the interpretation applicable to the embodiment of FIGURE 3. As a further example of unequal pulses, it would be convenient to reverse the sequence of the above example by first initiating the shorter and weaker pulse, followed by the stronger pulse of increased duration.

The change in reservoir pressure, $\Delta p$, in the responding well at any moment, $t$, following the termination of a pulse 51, is determined by the diffusivity equation, shown in exponential integral form, as follows:

$$\Delta p = \frac{\mu q}{4\pi k h}\left[-Ei\left(-\frac{\phi c \mu r^2}{4k(t+\Delta t)}\right) + Ei\left(-\frac{\phi c \mu r^2}{4kt}\right)\right]$$

where $$Ei(-x) = -\int_x^\infty \frac{e^{-u}}{u}du$$

and the remaining terms are as defined hereinabove.

Additional pressure change at the responding well, caused by pulse 53 or any subsequent pulse, is also determined by the diffusivity equation, and the principle of superposition. Solution of the above equation permits a determination of reservoir storage and transmissibility in the vicinity of the given well pair, from the responsive pressure transient, as plotted in FIGURE 3.

Examination of the exponential integral solution to the diffusivity equation has shown that, for a relatively short pulse, the time lag is inversely proportional to permeability, and directly proportional to storage. For longer pulses, the relationships become more complex, but are readily determinable from a solution of the diffusivity equation.

It has now been shown that the amplitude of the responsive pressure change at an observation well, for a given time lag, is a measure of the relationship between transmissibility and storage, thereby permitting a separate determination of absolute values for these parameters.

In theory, it should be possible to complete a satisfactory evaluation of a reservoir in the vicinity of a given well pair by introducing a single flow rate pulse at a first well, such as pulse 51 of FIGURE 3, while determining the resulting pressure transient at the second well. That is, a theoretical analysis does not predict the necessity for initiating a second pulse such as pulse 53 of FIGURE 3. We have found in practice, however, that attempts to complete the process with a single pulse frequently lead to inconsistent and therefore unreliable results. A primary reason for the failure of such a procedure is believed to be the existence, in essentially all reservoirs, of inherent, unexpected changes in the "reservoir pressure trend" which often introduce greater pressure changes at the observation well than can be attributed to the flow rate pulse introduced at the input well.

There are three general classes of random, spurious, sub-sonic pressure fluctuations which naturally occur in most reservoirs, and therefore potentially interfere with the testing procedure of the invention. One class of such natural pressure changes is the "reservoir trend" which may involve only a gradual decline in pressure due to the cumulative withdrawal of fluids in a normal production schedule. The trend may also involve a gradual rise in pressure due to the influx of some drive mechanism, whether natural or artificial, such as a waterflood.

A second class of interferring pressure change is a relatively high frequency, low amplitude "noise" of uncertain origin which may be caused by surface disturbances such as sudden temperature changes caused by wind currents, thundershowers, intermittent sunshine, or the like, which may be minimized by proper insulation of the wellhead and instrument system. Other low-amplitude spurious pressure fluctuations may result from unstable phase relationships in the responsive well, such as the release of dissolved gas from an unstable liquid phase.

Perhaps the most troublesome of the natural pressure changes are the diurnal fluctuations caused by the daily temperature cycle, by atmospheric or barometric pressure changes, and by tides. The diurnal pressure effects have amplitudes and cycle times of somewhat the same order of magnitude as would be characteristic of pressure transients propagated through the reservoir, in the event a sequence of flow-rate changes were selected to provide an input pulse cycle time approximating a 24-hour period. It therefore becomes essential, in many reservoirs, to limit the input pulse cycle time to a period substantially less than 24 hours, preferably less than 16 hours. Otherwise, it may become virtually impossible to distinguish the artificially induced pressure transient from the naturally occurring diurnal changes.

Thus, the measurable pressure transient at an observation well includes, at any moment during the test procedure, both the inherent trend and the pressure transient introduced by the flow rate pulse. Of course, if it were possible to know what the inherent trend would have been at the observation well in the absence of the introduced pulse, it would be a simple matter to subtract the trend from the observed pressure changes. A satisfactory method for predicting the inherent trend has not been developed. However, we have discovered that the values $\Delta P$ and $t_L$ (FIGURE 3) are not sensitive to distortion caused by such inherent reservoir pressure trends, provided a third change in flow rate is introduced into the reservoir at the input well, such as indicated by pulse 53 of FIGURE 3.

If the inherent reservoir trend remains linear during the period of responsive pressure change, then the values $\Delta P$ and $t_L$ (FIGURE 3) are independent of the slope of the inherent trend. This becomes extremely important, since it eliminates the need for estimating or predicting the inherent trend.

Such independence of $\Delta P$ and $t_L$ can be demonstrated by a consideration of the fact that these values are based upon only three selected points along the responsive pressure transient; namely A, B and C. Thus, a linear trend subsequent to the time of initiating the first pulse, whatever its slope may be, will affect points A, B and C by shifting each point in the same direction along the pressure coordinate, a distance proportional to the total elapsed time. As a result, the slope of the line AB will be changed; however, the distance between line AB and point C (i.e., $\Delta P$), measured along the pressure coordinate, will not change.

It is within the scope of the invention to continue the testing procedure by introducing into the reservoir a sequence of more than three flow rate changes, while continuing to determine the resulting pressure transient at an observation well. The additional pattern of flow rate changes beyond the first three, which are considered essential to the embodiment of FIGURE 3, does provide a further check on the reliability or reproducibility of the test results. However, the interpretation becomes somewhat more complex inasmuch as a cumulative long-term transient must be accounted for at the observation well, in addition to any inherent reservoir trend and the pressure response attributable to an individual pulse.

In accordance with a preferred modification of the embodiment of FIGURE 3, the initial input pulse cycle must have a length equal to or greater than a dimensionless time of about 0.3, and no greater than 3.0. The dimensionless pulse cycle time $(\Delta t + \Delta t_b)_D$ is defined as:

$$\frac{k(\Delta t + \Delta t_b)}{948 \phi c \mu r^2}$$

where:

$\Delta t$ = pulse time, hr.
$\Delta t_b$ = time between pulses, hr.
$k$ = permeability, md.
$\phi$ = porosity
$c$ = compressibility of reservoir fluids, vol./vol./p.s.i.
$\mu$ = viscosity of reservoir fluids, cps.
$r$ = distance between pulsed well and responding well, ft.

This modification requires some advance estimate of reservoir properties, since the dimensionless pulse cycle time is defined in terms of reservoir permeability and porosity, and in terms of the compressibility and viscosity of reservoir fluids. An estimate of these properties is obtained from the analysis of core or cuttings samples obtained in the drilling of wells, from early production data, from samples of reservoir fluids, and from conventional buildup or drawndown tests.

Suitable input pulse durations and amplitudes for use in a given area are best determined by first monitoring the background pressure fluctuations in a representative number of wells. A stable reservoir, characterized by small or negligible inherent pressure fluctuations, is amenable to pulse-testing with a relatively weak pressure disturbance, whereas a stronger pulse is required in a less stable reservoir. Pulse amplitude and duration are preferably selected to maximize the contrast between the desired pressure response and the natural background variations.

The differential pressure response recorded in the practice of the invention is a transistory phenomenon. The net, or residual pressure change at a responsive well due to a pulse or pulse series is usually negligible.

The generation of an individual pulse is typically achieved at an input well by changing from one flow rate to another, whether injection or production flow as the case may be, and then returning the well to its initial rate of flow. The input pulse amplitude is the difference between the initial and the adjusted rates. Suitable amplitudes for most applications of the invention are generated by flow rate changes ranging from 30 barrels per day up to as much as 5,000 barrels per day or more, depending upon reservoir transmissibility and well spacing. Flow rate changes in excess of a few hundred bbls./day are feasible in only a few reservoirs, for example, in highly permeable reservoirs having wells which typically produce several thousand barrels of oil daily.

The duration of a pulse is the time interval during which the adjusted flow rate is maintained. Suitable pulse durations require that the adjusted flow rate be maintained for at least five seconds and as much as several hours, preferably in the range from 5 minutes to 8 hours, depending primarily upon the selected difference between the adjusted flow rate and the normal flow rate of the given well. For example, a strong pulse is generated by shutting in a 5,000/bbls./day well for only a few minutes, while it would take a matter of hours to generate a substantial pulse by shutting in a 30/bbls./day flow.

Pulse testing in accordance with this invention also provides specific information relative to the location of permeability barriers in a reservoir. For example, referring again to FIGURE 2, a failure to detect any pulse arrival at well 13 is clear evidence of a major fault or pinch-out structure blocking permeability between the wells.

Moreover, the location of such a barrier is determined by measuring the time lapse of a reflected pulse in traversing the reservoir interval from a disturbed well to the permeability barrier, and then back to the disturbed well or to an adjacent well on the same side of the barrier.

In certain areas it is commonplace for a single wellbore to penetrate more than one permeable, productive zone. The practice of providing multiple well completions within such a wellbore is well known. Fluids produced from the separate zones may be commingled within the well and lifted to the surface through a single tubing string, or separate tubing strings and separate lift means may be provided, in which case packing means are placed within the wellbore to prevent a commingling of the produced fluids.

The added expense of providing multiple tubing strings and multiple lift means can frequently be avoided by proving that the impermeable interval which separates the productive zones is not continuous, i.e., that the separate productive zones are in fact a single reservoir. The method of the present invention can be employed to provide such proof, gy generating a pressure pulse within one of the productive zones and determining whether such a pulse is transmitted to another productive zone. A transmission of the pulse from one zone to another is clear evidence that the two zones are interconnected.

The testing of multiple zones can be carried out in a single wellbore, or between separate walls. Within a single well, a pulse is selectively generated at the level of a given productive zone by first isolating the zone with conventional wellbore packers, and then imposing some change in the rate of flow to or from the single zone, as already described. The detection of a responsive pattern is then sought by measuring pressure changes opposite a different permeable zone.

Between wells, the testing of multiple zones is carried out by selectively generating a pulse or series of pulses in a single permeable zone at a first well, and determining the responsive pressure variations, if the transmission is successful, at a second well by isolating therein a permeable zone other than the one in which the pressure change or changes are generated.

What is claimed is:

1. A method for evaluating a porous subterranean fluid-bearing reservoir penetrated by a plurality of boreholes which comprises changing the rate of fluid flow at least three times at a first borehole, and measuring the resulting pressure transient at a second borehole.

2. A method as defined by claim 1 wherein said flow rate changes include a decrease and an increase in flow rate, and wherein said step of measuring the resulting pressure transient includes a determination of the maximum amplitude of the responsive pressure change, and the time lag between a given flow-rate change and the detection of a corresponding change in the pressure transient.

3. A method wherein the steps of claim 1 are repeated in the same reservoir at a different pair of boreholes, whereby a comparison of the pressure transients reveals the presence of any differences in the fluid flow characteristics of the reservoir between the corresponding well pairs.

4. A method as defined by claim 1 wherein said pressure transient is generated by injecting a fluid at a first flow rate through said first borehole and into said reservoir, continuing said injection at a second flow rate for at least five minutes, then substantially reestablishing said first rate of injection flow for at least five minutes, and thereafter again changing said flow rate, and wherein the resulting transient pressure response is determined at said second borehole.

5. A method as defined by claim 4 wherein the time interval between said periods of injection flow bears a ratio to the time of injection flow in the range of 0.1:1 up to 20:1.

6. A method as defined by claim 1 wherein said pressure transient is generated by producing fluids from said reservoir through said first borehole at a first rate of flow, then continuing to produce fluids from said reservoir through said borehole at a second rate of flow, then substantially reestablishing said first rate of production flow, and thereafter again changing said flow rate, and wherein the resulting transient pressure response is determined at said second borehole.

7. A method as defined by claim 1 wherein said pressure transient is generated by introducing a flow rate pulse cycle into the reservoir at said first borehole, said flow rate pulse cycle having a dimensionless time of at least 0.3, thereby initiating a pressure transient within the reservoir, and wherein pressure changes as a function of time are determined at a second borehole in the reservoir.

8. A method as defined by claim 7 wherein the duration of said pulsing cycle is equal to a dimensionless time within the range of 0.3 to 3.0.

9. A method as defined by claim 1 wherein the time interval between two of said flow rate changes is at least five minutes, but not more than eight hours.

10. A method as defined by claim 1 wherein said pressure transient is generated by producing fluids from said reservoir through a first borehole at a rate of at least thirty barrels per day, wherein the initial period of production flow is maintained for at least five minutes, and wherein the ratio of the time interval between periods of production flow is at least one tenth as great as the initial period of production flow, but not more than twenty times as great.

11. A method of evaluating a subsurface fluid-bearing formation which comprises generating a fluid flow-rate pulse within the formation at a first point, detecting the time of arrival of the resulting pressure transient at a second spaced point within said formation, initiating a second flow-rate pulse at said first point in said formation prior to subsidence of said pressure transient at said second point, and detecting the time of arrival at said second point of the pressure transient which results from initiation of said second flow-rate pulse.

12. A method as defined in claim 11 in which said first and second fluid flow-rate pulses are generated within said formation without fracturing the formation.

13. A method as defined in claim 11 wherein said pressure transient is detected with a sensitivity of at least plus or minus 0.01 p.s.i.

14. A method as defined in claim 11 wherein the interval of time between said first and second flow-rate pulses is greater than about 0.1 the duration of said first pulse but less than about 20 times the duration of said first pulse.

15. A method as defined in claim 11 wherein the first flow-rate pulse cycle has a dimensionless time in the range 0.3 to 3.0; where:

$$(\Delta t + \Delta t_b)_D = \frac{k(\Delta t + \Delta t_b)}{948 \phi c \mu r^2}$$

$\Delta t$ = pulse time, hr.
$\Delta t_b$ = time between pulses, hr.
$k$ = permeability, md.
$\phi$ = porosity
$c$ = compressibility of reservoir fluids, vol./vol./p.s.i.
$\mu$ = viscosity of reservoir fluids, cps.
$r$ = distance between pulsed well and responding well, ft.

16. A method of evaluating a subsurface fluid-bearing formation penetrated by two spaced wells which comprises imparting a first fluid flow-rate pulse into said formation from a first of said wells, detecting the arrival time and amplitude of the resulting pressure transient at the second of said wells, initiating a second fluid flow-rate pulse in said formation from said first well following detecting of said pressure transient at said second well but prior to complete subsidence of said pressure transient at said second well, and detecting at said second well the arrival time of the pressure transient which results from initiation of said second flow-rate pulse.

17. A method for evaluating a fluid-bearing subterranean formation penetrated by a plurality of wells which comprises generating a pressure transient within the formation by introducing a sequence of fluid flow-rate changes at one of said wells, and measuring pressure changes caused by said sequence at another of said wells, with a sensitivity of at least 0.01 p.s.i., as a function of time.

18. A method as defined in claim 17 wherein said step of measuring the resulting pressure changes includes a determination of the maximum amplitude of the responsive pressure change, and the time lag between a given flow-rate change and the detection of a corresponding change in the responsive pressure transient.

References Cited by the Examiner

UNITED STATES PATENTS 2,207,281  7/1940  Athy et al. _____ 73—152 X

RICHARD C. QUEISSER, *Primary Examiner.*

J. W. MYRACLE, *Assistant Examiner.*